United States Patent [19]

Keifer et al.

[11] 4,249,953

[45] Feb. 10, 1981

[54] AIR PORE LACQUERS CONTAINING WHITE PIGMENTS OR WHITE FILLERS

[75] Inventors: Siegfried Keifer; Hans G. Völz, both of Krefeld, Fed. Rep. of Germany

[73] Assignee: Bayer Aktiengesellschaft, Leverkusen, Fed. Rep. of Germany

[21] Appl. No.: 760,216

[22] Filed: Jan. 17, 1977

Related U.S. Application Data

[63] Continuation of Ser. No. 598,603, Jul. 24, 1975.

[30] Foreign Application Priority Data

Aug. 17, 1974 [DE] Fed. Rep. of Germany ....... 2439549

[51] Int. Cl.³ .......................... C08K 3/22; C08L 1/08
[52] U.S. Cl. .................... 106/193 R; 106/195; 260/37 R
[58] Field of Search .............................. 106/193, 195; 260/2.5 M, 2.5 B; 264/41

[56] References Cited

U.S. PATENT DOCUMENTS

| | | | |
|---|---|---|---|
| 3,899,554 | 8/1975 | Kaiser et al. | 264/41 |
| 3,907,581 | 9/1975 | Willcox | 106/193 J |

*Primary Examiner*—Hosea E. Taylor
*Assistant Examiner*—Amelia B. Yarbrough
*Attorney, Agent, or Firm*—Sprung, Felfe, Horn, Lynch & Kramer

[57] ABSTRACT

An air pore lacquer comprising a solvent, a binder and at least one additive which is a white pigment or white filler, the additive having an average particle size $\overline{D}_{zv}$ which is at least about 10% smaller than the optimum average particle size for the same binder free from air pores. When the additives are pigments they are preferably 20 to 50% smaller, and when they are fillers preferably 20 to 80% smaller, than the optimum particle size for the air pore-free binder. Rutile and anatase $TiO_2$ are preferred.

11 Claims, No Drawings

AIR PORE LACQUERS CONTAINING WHITE PIGMENTS OR WHITE FILLERS

This is a continuation of application Ser. No. 598,603, filed July 24, 1975, now pending.

Air pore lacquers consist of organic binders which contain air as a disperse phase. Air has a lower optical refractive index than the organic binder. Owing to the relatively small difference in refractive index between the binder and air, pure air pore lacquers generally have only a slight scattering and covering power. Therefore coats of air pore lacquers applied in the prescribed thicknesses have insufficient covering power or, if the lacquers may be applied in any desired thickness, relatively thick coats are required to cover a surface. These features are disadvantageous compared with white paints which contain white pigments. White paints are still used almost exclusively.

According to J.Paint Tech. 45, No. 584, 73 (1973), films which contain air pores can be produced by the following methods:

(a) dispersion of prefinished, insoluble, air-containing microcapsules of a cross-linked polymer in a solution of binder;

(b) formation of films from polymer or binder solutions which contain insoluble droplets or finely divided solid particles of substances such as waxes or inorganic salts. The film is subjected to selective extraction. i.e. the disperse phase should be soluble in the solvent and the surrounding medium should be insoluble. The disperse phase is displaced by the solvent. The solvent evaporates from the micropores and air pores are formed so that the film scatters light, i.e. it becomes opaque;

(c) film formation from incompatible polymer mixtures in which one component becomes chemically cross-linked and the other is dried physically, i.e. it remains soluble. The soluble polymer is dissolved out of the mixture. After evaporation of the solvent from the micropores, air pores are left behind in the chemically cross-linked medium; or (d) film formation from a polymer which is dissolved in at least two miscible solvents. At least one liquid is not a solvent for the polymer when used on its own. Moreover, this non-solvent must have a lower volatility than the other solvent or solvents of the mixture. After evaporation of the more volatile solvent or solvents, the non-solvent is deposited in the form of microscopically fine droplets in the forming film owing to its incompatibility with the polymers.

After evaporation of the non-solvent, the air pores remain behind as centers of light scattering. The scattering power of the film can be controlled by the quantity of non-solvent used.

The last mentioned method of producing air pore lacquers is generally the simplest one to carry out in practice.

Experiments have also been carried out to determine the effects of pigmentation of air pore lacquers with titanium dioxide pigments. It was found that when air pore lacquers are pigmented with $TiO_2$ pigments, the optical properties, such as the brightening and covering power, increase very much more than in binders which do not contain air pores (J. A. Seiner, H. L. Gebhardt, XI, Fatipec-Kongress Florenz, Kongressbuch, Edizione Ariminum, Mailand, page 127 et seq). Seiner and Gebhardt found, for example, that for a given titanium dioxide pigment content, an air pore lacquer has a brightening power 60% to 100% higher than a normal lacquer, depending on the titanium dioxide concentration.

It has now been found that this effect of reinforcing the brightening power found in air pore lacquers is unexpectedly increased by using white pigments or white fillers which have substantially smaller particle sizes than are optimal for lacquer binders which are free from air pores.

The present invention relates to air pore lacquers which contain binders, conventional lacquer additives, white pigments and/or white fillers with average particle sizes $\overline{D}_{zv}$ which, in the case of white pigments, are at least about 10% and preferably about 20 to 50% and in the case of fillers at least about 10% preferably about 20 to 80%, below the optimum average particle sizes for binders which are free from air pores.

If white pigments or white fillers with particle sizes substantially smaller than are optimum for normal lacquer binders are added to air pore lacquers according to the invention, a substantial increase in the brightening power is observed. This result was not expected since, in normal binders, the brightening power decreases progressively as the particle size of the white pigments or white fillers decreases from the optimum size.

The optimum average particle sizes $\overline{D}_{zv}$ (diameter medium value or central value of volume distribution, see DIN 53 206 Sheet 1) for lacquer binders which are free from air pores depend primarily on the type of white pigment or filler used. The $\overline{D}_{zv}$ values of various pigments or fillers used in conventional lacquer binders are known or can easily be calculated, e.g. as shown in W. Jaenicke, J.F.Elektrochem. 60 (1956), page 163 et seq. The following values are found: titanium dioxide (rutile) 0.23 $\mu$m, anatase 0.27 $\mu$m, zinc blend 0.30 $\mu$m, zinc white 0.47 $\mu$m, lead white 0.50 $\mu$m and barium sulfate 1.28 $\mu$m. The following values are also obtained from Jaenicke's formula: dolomite 2.18 $\mu$m, calcium carbonate 2.39 $\mu$m, talcum 2.66 $\mu$m, and china clay 2.98 $\mu$m.

Compared with these average particle sizes $D_{zv}$ which are optimal for binders free from air pores, the average particle sizes $\overline{D}_{zv}$ of white pigments or white fillers incorporated in the air pore lacquers according to the invention are, in the case of pigments, at least 10% and preferably 20 to 50% smaller, and, in the case of fillers, at least 10% and preferably 20 to 80% smaller.

Thus, the average particle size $\overline{D}_{zv}$ of titanium dioxide (rutile) used in the air pore lacquers according to the invention is at most about 0.21 $\mu$m, and preferably about 0.18 to 0.12 $\mu$m, and that of anatase is at most about 0.24 $\mu$m, and preferably about 0.22 to 0.14 $\mu$m.

According to the invention, white pigments or fillers may be added to the air pore lacquers in quantities of about 0.3 to 400% by weight, preferably about 5 to 100% by weight, based on the binder.

Suitable white pigments are e.g. titanium dioxide (anatase or rutile), zinc sulfide (lithopone), zinc oxide, basic lead carbonate, basic lead sulfate, antimony trioxide, or mixtures containing at least two of these white pigments. Titanium dioxide in the form of rutile or anatase is particularly suitable.

Examples of suitable fillers include barium sulfate, calcium carbonate, calcium silicate, calcium sulfate, china clay (kaolin), dolomite (calcium-magnesium carbonate), mica, chalk, powdered quartz, talcum or mixtures consisting of at least two of these fillers. Barium sulfate, calcium carbonate and dolomite are particularly suitable.

The white pigments or fillers with suitable average particle sizes $\overline{D}_{zv}$ according to the invention may be prepared by the known methods used for the preparation of pigments or fillers. Finely divided titanium dioxide, for example, may be prepared by the known sulfate process, using a larger quantity of foreign nuclei for hydrolysis or providing a larger quantity of water of hydrolysis, depending on whether the process is carried out with foreign nuclei or self-nuclei (Gmelins Handbuch d. Anorg, Chemie, Syst.-No. 41. Titan, Verl.-Chemie, Weinheim/Bergstr. 1951, p. 97 et seq J. Barksdale, Titanium, Ronald Press Comp., New York, 1949, p. 150 et seq). Finely divided $TiO_2$ particles which may be used according to the invention can also be prepared by the known chloride process. In this process, the particle size of the $TiO_2$ can be controlled by the usual methods which are known to influence particle size, e.g. increasing the formation of nuclei by the addition of $H_2O$ or reacting part of the titanium tetrachloride with oxygen in a reaction preceding the main reaction.

The white pigments or fillers used according to the invention may also be obtained by subjecting pigments or fillers which have been prepared by the usual methods to a process of sedimentation or some other method commonly employed for classification to obtain fine fractions.

The degree of purity of the white pigments or white fillers used is not very critical and may vary over a wide range, depending upon the method of preparation employed. thus, for example, $TiO_2$ particles may often contain considerable quantities of water and sulfate or chloride ions.

The conventional binders commonly used for the preparation of lacquers may also be used for preparing the air pore lacquers according to the invention, e.g. alkyd resins, polyester resins, epoxide resins, polyurethane resins, acrylic resins, vinyl resins, silicone resins, chlorinated rubber, nitrocellulose and combinations thereof. Physically drying binders are particularly suitable, e.g. alkyd resins, nitrocellulose and combinations of the two systems, as well as chlorinated rubber.

The air pore lacquers according to the invention may also contain conventional lacquer additives such as wetting agents, thickeners, levelling agents and plasticizers.

Incorporation of the white pigments and/or fillers in the binder may be carried out by known methods, e.g. by means of ball mills, rollers, dissolvers, or bead mills.

The following Examples illustrate the process according to the invention in more detail.

EXAMPLE 1: Pure air pore lacquer without pigment

The paint system used as binder combination widely used for furniture varnishes. The following formulation was employed:
Formulation of ground goods (triturated: 3 hours in a vibratory ball mill):
Ground paste:
    23 g of ester-soluble, low viscosity nitrocellulose wool,
    37 g of ethyl acetate,
    10.5 g of peanut oil content (oil content 41%), 70% in xylene,
    1.5 g of dibutyl phthalate, and
    1.5 g of benzoyl butyl phthalate.
Top lacquer:
    50 g of clear lacquer (ground paste without $TiO_2$)+25 g of white spirit/light petrol 1:1

The scattering and covering power were determined. The scattering power was determined according to DIN 53 164 and the covering power was then calculated according to the formulae in DIN 53 162. Three experimentally obtainable values are necessary for determining the scattering power of the coats applied: the degree of reflectance (with a Y filter or monochromatically) of an optically infinitely thick layer of the paint, the degree of reflectance of a non-covering coat over a black surface and the thickness of its layer. The surfaces to which the coats were applied were black glass plates. The thicknesses of the layers were determined with a light section microscope. The scattering power or covering power was calculated with the aid of the Kubelka-Munk equations given in DIN 53 164. The results are shown in Table 1.

EXAMPLE 2: Conventional lacquer with conventional $TiO_2$ pigment

Conventional rutile pigments for paints (average particle size $\overline{D}_{zv}$ 0.18 μm) with pigment volume concentrations (PVK) of 1.5% and 6.5%.

Paint system as in Example 1 containing 0.91 g of $TiO_2$ for a pigment volume concentration of 1.5% or 4.73 g of $TiO_2$ for a pigment volume concentration of 6.5%.

Top lacquer:
    Pigment volume concentration 1.5%: 60 g of ground paste+10 g of ethyl acetate
    Pigment volume concentration 6.5%: 63 g of ground paste+10 g of ethyl acetate.

The results are shown in Table 1.

EXAMPLE 3: Conventional lacquer with $TiO_2$ pigment according to the invention

Finely divided rutile pigments (average particle size $\overline{D}_{zv}$ 0.15 μm) with pigment volume concentrations of 1.5% and 6.5% were incorporated in the lacquer in accordance with the invention. The very finely divided rutile pigments were prepared by sedimentation as follows: A conventional rutile pigment prepared by the sulfate process (without after-treatment) and having an average particle size $\overline{D}_{zv}=0.18$ μm (most frequent diameter of the volume distribution according to DIN 53 206, sheet 1) was dispersed in water to form a suspension with a solids content of 5%. A small quantity of sodium hexametaphosphate and 50% sodium hydroxide solution was added to assist dispersion. The suspension was dispersed with the aid of a high speed stirrer for 5 minutes and then poured into a plastic bottle. The bottle was kept in an air conditioning cupboard at 60° to 70° C. to enable sedimentation to take place. After 10 days, the upper 15 cm of suspension was siphoned off. The suspension was centrifuged in centrifuge tubes at 3800 revs/min for 20 minutes. The supernatant solutions which were still very cloudy were collected, adjusted to pH 5.5 with HCl and boiled. The pigment finally flocculated. This fraction was combined with the residue from the centrifuge tubes and the two together were suction filtered and washed with ion exchanger water until the filtrate was neutral. The filter cake was dried in a vacuum at 40° C. for 8 hours. Particle size analyses of the starting product and end product were carried out by an optical process. The results are shown in Table 2.

TABLE 2

| | $\overline{D}_{zv}$ in $\mu$m | (log of distribution range) |
|---|---|---|
| Starting product | 0.181 | 1.40 |
| End product | 0.153 | 1.40 |

The paint system and top lacquer were produced as in Example 2. The scattering power and covering power of the air pore lacquer obtained are shown in Table 1.

EXAMPLE 4: Air pore lacquer with conventional TiO₂ pigment

The same pigment as in Example 2 was used. The paint system was similar to that of Example 1.
Top lacquer:
  Pigment volume concentration 1.5%: 52 g of ground paste + 25 g of white spirit/light petrol (1:1)
  Pigment volume concentration 6.5%: 55 g of ground paste + 25 g of white spirit/light petrol (1:1).
The results are shown in Table 1.

EXAMPLE 5: Air pore lacquer with TiO₂ pigment according to the invention

The finely divided rutile pigment of Example 3 was used. The paint system and top lacquer were as in Example 4.
The results are given in Table 1.

TABLE 1

| Paint system | Pigment Volume concentration, % | Scattering power mm$^{-1}$ | Covering power m$^2$/l solid |
|---|---|---|---|
| Example 1 | | 12.8 | 1.4 |
| Example 2 | 1.5 | 9.2 | 1.2 |
| | 6.5 | 49.7 | 5.8 |
| Example 3 | 1.5 | 7.3 | 1.0 |
| | 6.5 | 46.7 | 5.3 |
| Example 4 | 1.5 | 20.8 | 2.3 |
| | 6.5 | 100.7 | 10.5 |
| Example 5 | 1.5 | 36.3 | 4.0 |
| | 6.5 | 129.0 | 13.9 |

It can be seen from Table 1 that the air pore lacquer containing the more finely divided rutile pigment according to the invention (Example 5) is optically more powerful than the standard rutile pigment (Example 4) by about 30% when the pigment volume concentration is 6.5% and by as much as around 70% when the pigment volume concentration is 1.5%. In the conventional paint system without air pores, the more finely divided rutile pigment has a lower scattering and covering power, as would be expected (Examples 2 and 3).

EXAMPLE 6: Air pore lacquer with conventional filler

A filler which is optimal for conventional paints (calcite with an average particle size of $D_{zv}=2.40$ $\mu$m) was incorporated in an air pore lacquer based on chlorinated rubber at a pigment volume concentration of 6.5% in accordance with the following formulation:
25.0 g of chlorinated rubber (average molecular weight $\overline{M}_w$ 185,000),
100.0 g of chloroform,
20.0 g of light petrol, and
3.1 g of calcite.
  Triturate: 3 hours in a vibratory ball mill.
  The results are shown in Table 2.

EXAMPLE 7: Air pore lacquer with filler according to the invention

A filler according to the invention (calcite with average particle size of $\overline{D}_{zv}=1.50$ $\mu$m) was used in the same formulation as in Example 6.
The results are shown in Table 2.

TABLE 2

| Paint system | Pigment volume concentration, % | Scattering power mm$^{-1}$ | Covering power m$^2$/l solid |
|---|---|---|---|
| Example 6 | 6.5 | 24.3 | 3.0 |
| Example 7 | 6.5 | 30.6 | 3.8 |

It can be seen that the lacquer of Example 7 in accordance with the present invention has far more covering power than the comparison in Example 6.

It will be appreciated that the instant specification and examples are set forth by way of illustration and not limitation, and that various modifications and changes may be made without departing from the spirit and scope of the present invention.

What is claimed is:

1. An air pore film comprising a binder, air pores, and at least one additive which is a white pigment or white filler, the additive having an average particle size $D_{zv}$ which is at least about 10% smaller than the optimum average particle size for maximum scattering power for the same binder free from air pores.

2. An air pore film according to claim 1, wherein the additive is a white pigment having an average particle size about 20 to 50% smaller than the optimum average particle size for the same binder free from air pores.

3. An air pore film according to claim 1, wherein the additive is a white filler having an average particle size about 20 to 80% smaller than the optimum average particle size for the same binder free from air pores.

4. An air pore film according to claim 1, wherein the additive is selected from the group consisting of titanium dioxide, zinc sulfide, zinc oxide, basic lead carbonate, basic lead sulfate, antimony trioxide, barium sulfate, calcium carbonate, calcium silicate, calcium sulfate, china clay, dolomite, mica, chalk, quartz and talcum.

5. An air pore film according to claim 1, wherein the additive is rutile titanium dioxide with an average particle size of less than about 0.21 $\mu$m.

6. An air pore film according to claim 1, wherein the additive is anatase titanium dioxide with an average particle size of less than about 0.24 $\mu$m.

7. An air pore film according to claim 1, wherein the additive is present in about 0.3 to 400% by weight, based on the binder.

8. An air pore film according to claim 7, wherein the additive is rutile titanium dioxide with an average particle size of about 0.12 to 0.18 $\mu$m.

9. An air pore film according to claim 7, wherein the additive is anatase titanium dioxide with an average particle size of about 0.14 to 0.22 $\mu$m.

10. A lacquer which, upon application to a substrate and drying, leaves an air pore film, said lacquer comprising a binder, a solvent for said binder, a liquid miscible with said solvent but not a solvent for said binder, the solvent being more volatile than the non-solvent, and at least one additive which is a white pigment or white filler, the additive having an average particle size $D_{zv}$ which is at least about 10% smaller than the optimum average particle size for maximum scattering power for a pore-free film from the same binder.

11. A lacquer according to claim 10, wherein the additive has an average particle size at least about 20% smaller than said optimum particle size, is present in about 0.3 to 400% by weight of the binder and is selected from the group consisting of titanium dioxide, zinc sulfide, zinc oxide, basic lead carbonate, basic lead sulfate, antimony trioxide, barium sulfate, calcium carbonate, calcium silicate, calcium sulfate, china clay, dolomite, mica, chalk, quartz and talcum.

* * * * *